(12) United States Patent
Goodman et al.

(10) Patent No.: US 12,321,242 B2
(45) Date of Patent: Jun. 3, 2025

(54) DATA RECOVERY IN A CONTINUOUS DATA PROTECTION SYSTEM

(71) Applicant: Huawei Technologies Co., Ltd., Shenzhen (CN)

(72) Inventors: Daniel Goodman, Hod Hasharon (IL); Eddy Duer, Hod Hasharon (IL); Igor Shafran, Hod Hasharon (IL); Itamar Ofek, Hod Hasharon (IL); Michael Hirsch, Hod Hasharon (IL); Shaul Tamari, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 18/188,719

(22) Filed: Mar. 23, 2023

(65) Prior Publication Data
US 2024/0004764 A1    Jan. 4, 2024

Related U.S. Application Data

(63) Continuation of application No. PCT/EP2020/076699, filed on Sep. 24, 2020.

(51) Int. Cl.
*G06F 11/14* (2006.01)

(52) U.S. Cl.
CPC ...... *G06F 11/1469* (2013.01); *G06F 2201/84* (2013.01)

(58) Field of Classification Search
None
See application file for complete search history.

*Primary Examiner* — Eddy Cheung
(74) *Attorney, Agent, or Firm* — Conley Rose, P.C.

(57) ABSTRACT

In a method for data recovery in a continuous data protection system, delta values representing an exclusive disjunction between successive values of data block contents of a content fragment of a dataset at a time t(n) and a time t(n−1) for n=1 to i, where i is selected according to a predetermined data protection profile, are generated. The delta values can be used to recover a dataset to a value at the selected point in time in association with a snapshot that is selected as a starting point for recovery based on a cost analysis associated with a volume of disk activity to restore.

20 Claims, 3 Drawing Sheets

DATA RECOVERY IN A CONTINUOUS DATA PROTECTION SYSTEM

CROSS-REFERENCE TO RELATED APPLICATIONS

This application is a continuation of International Patent Application No. PCT/EP2020/076699, filed on Sep. 24, 2020. The disclosure of the aforementioned application is hereby incorporated by reference in its entirety.

TECHNICAL FIELD

Aspects relate, in general, to a method for data recovery in a continuous data protection system, and more particularly, although not exclusively, to a method for multi-directional data recovery.

BACKGROUND

Continuous data protection (CDP) is a backup solution in which a copy of user data is automatically saved every time a change is made to that data. For example, the contents of updated disk blocks can be streamed from a source machine to a target (e.g., backup) machine. Thus, when data is written to a disk of the source machine, it can also be asynchronously written to the target machine.

CDP can be extended to a near-continuous form in which snapshots of the state of the data of the source machine are taken at particular intervals. A history of the snapshots is stored to enable the source machine to be restored to a point in time (PIT) corresponding to one of the snapshots. However, restoring to a specific point in time can be a very slow process and current solutions to improve this come with additional resource costs and limitations. Furthermore, restoration to a particular PIT uses a snapshot before the PIT in question as a starting point, with all subsequent datasets applied between that snapshot and the required restoration point. On average, this is a computationally expensive operation, especially in cases where the PIT is more than halfway through a snapshot window for example. Additionally, once a snapshot is deleted, there is no way to restore to a PIT before the oldest snapshot, even if all datasets are stored.

SUMMARY

According to a first aspect, there is provided a method for data recovery in a continuous data protection system, the method comprising generating delta values, $d(n)$, representing an exclusive disjunction between successive values of data block contents of a content fragment of a dataset at a time $t(n)$ and a time $t(n-1)$ for $n=1$ to $i$, where $i$ is selected according to a predetermined data protection profile, providing measures, $r(n)$, of the number of operations performed by the data protection system in storing the contents of a data block at time $t(n)$, storing snapshots, $s(f(p))$, at preselected intervals, of the contents of the content fragment at $t(p)$ where $p \subseteq n$, and $f(p)$ is a function that is selected according to the predetermined data protection profile, using the measures, $r(n)$, calculating a cost to restore the dataset to a value at a selected point in time, $t(j)$, from first $s(f(pa))$ and second $s(f(pb))$ snapshots, the first and second snapshots defining a recovery window within which the selected point lies, selecting the snapshot $s(f(pq))$ that minimizes the cost to restore, where $q=a$ or $b$, and recovering the dataset to the value at the selected point in time, $t(j)$, using the selected snapshot $s(f(pq))$ and each of the delta values $d(pq)$ to $d(j)$.

Advantageously, delta-values can be used to restore to a PIT within a recovery window starting from either of the snapshots that define the recovery window. That is, delta-values can be applied in either direction from a snapshot of a recovery window in order to enable restoration of data to a desired PIT within that recovery window. Accordingly, applying the delta-value to current contents enables generation of the new value of a block and reapplying this delta-value restores the contents to the previous value.

The cost to restore the dataset comprises a measure representing a number of input/output (read/write) operations.

Advantageously, using these measures of disk activity, representing a volume of disk operations, the method can start from a snapshot after a required PIT restoration point and proceed by application to intermediate datasets in order to reverse changes to achieve the desired state.

In a particularly advantageous scenario, for PITs more than halfway through the window and thus relatively farther away from a snapshot at the start of a restoration window than at the end, the restoration method provided herein is faster and less resource intensive than the case described above in which a prior (to a required PIT) snapshot is used as a starting point irrespective of whether that will incur large computational costs.

In an implementation of the first aspect, a snapshot of the contents of the content fragment can be generated. The data protection profile can define an interval for generation of the snapshot. The interval can be regular or irregular. For example, the interval can be determined based on a pattern of input/output (read/write) operations.

That is, the interval can be based on the volume of disk operations, thereby providing an efficient way of generating snapshots that minimizes the unnecessary generation of snapshots by taking into account disk (e.g., input/output) activity. Thus, the more activity (i.e., the larger the volume of disk activity) the more frequently snapshots may be generated, and conversely in the case of low activity resulting in a less frequent generation pattern.

The exclusive disjunction between successive values of data block contents of a content fragment of a dataset comprises an exclusive-OR (XOR) operation performed on pairs of values. The pairs of values can be successive values.

According to a second aspect, there is provided a non-transitory machine-readable storage medium encoded with instructions for data recovery in a continuous data protection system, the instructions executable by a processor of a machine whereby to cause the machine to generate delta values, $d(n)$, representing an exclusive disjunction between successive values of data block contents of a content fragment of a dataset at a time $t(n)$ and a time $t(n-1)$ for $n=1$ to $i$, where $i$ is selected according to a predetermined data protection profile, provide measures, $r(n)$, of the number of operations performed by the data protection system in storing the contents of a data block at time $t(n)$, store snapshots, $s(f(p))$, at preselected intervals, of the contents of the content fragment at $t(p)$ where $p \subseteq n$, and $f(p)$ is a function that is selected according to the predetermined data protection profile, use the measures, $r(n)$, to calculate a cost to restore the dataset to a value at a selected point in time, $t(j)$, from first $s(f(pa))$ and second $s(f(pb))$ snapshots, the first and second snapshots defining a recovery window within which the selected point lies, select the snapshot $s(f(pq))$ that minimizes the cost to restore, where $q=a$ or $b$, and recover the dataset to the value at the selected point in time, t(j), using the selected snapshot s(f(pq)) and each of the delta values d(pq) to d(j).

In an implementation of the second aspect, the non-transitory machine-readable storage can comprise further instructions to determine a volume of disk operations for the system, the volume of disk operations representing a measure of input/output activity of the disk, and use the determined volume of disk operations, generate the measure of the number of operations performed by the data protection system in storing the contents of a data block. Further instructions can be provided to compare the determined volume of disk operations to a predefined threshold value for disk activity, and on the basis of the comparison, generate a snapshot. In an example, the non-transitory machine-readable can comprise instructions to select a pair of snapshots demarcating a recovery window within which the selected point in time occurs.

According to a third aspect, there is provided a data backup apparatus comprising a processor configured to execute instructions stored in memory in order to perform a data recovery by applying one or more delta values generated according to the first aspect to a snapshot representing the state of a dataset, whereby to recover the dataset to a selected point in time. A storage to store at least one of a measure, snapshot and delta value can be provided. This storage may be distinct from the storage that is subject of a backup operation. In an implementation of the third aspect, the processor can select a pair of snapshots demarcating a recovery window within which the selected point in time occurs. The processor can calculate a cost for recovery using each snapshot of the pair of snapshots as a starting point in order to determine a measure of a volume of disk activity.

BRIEF DESCRIPTION OF DRAWINGS

For a more complete understanding of the present disclosure, reference is now made, by way of example only, to the following descriptions taken in conjunction with the accompanying drawings, in which.

DESCRIPTION OF EMBODIMENTS

Figure 1:
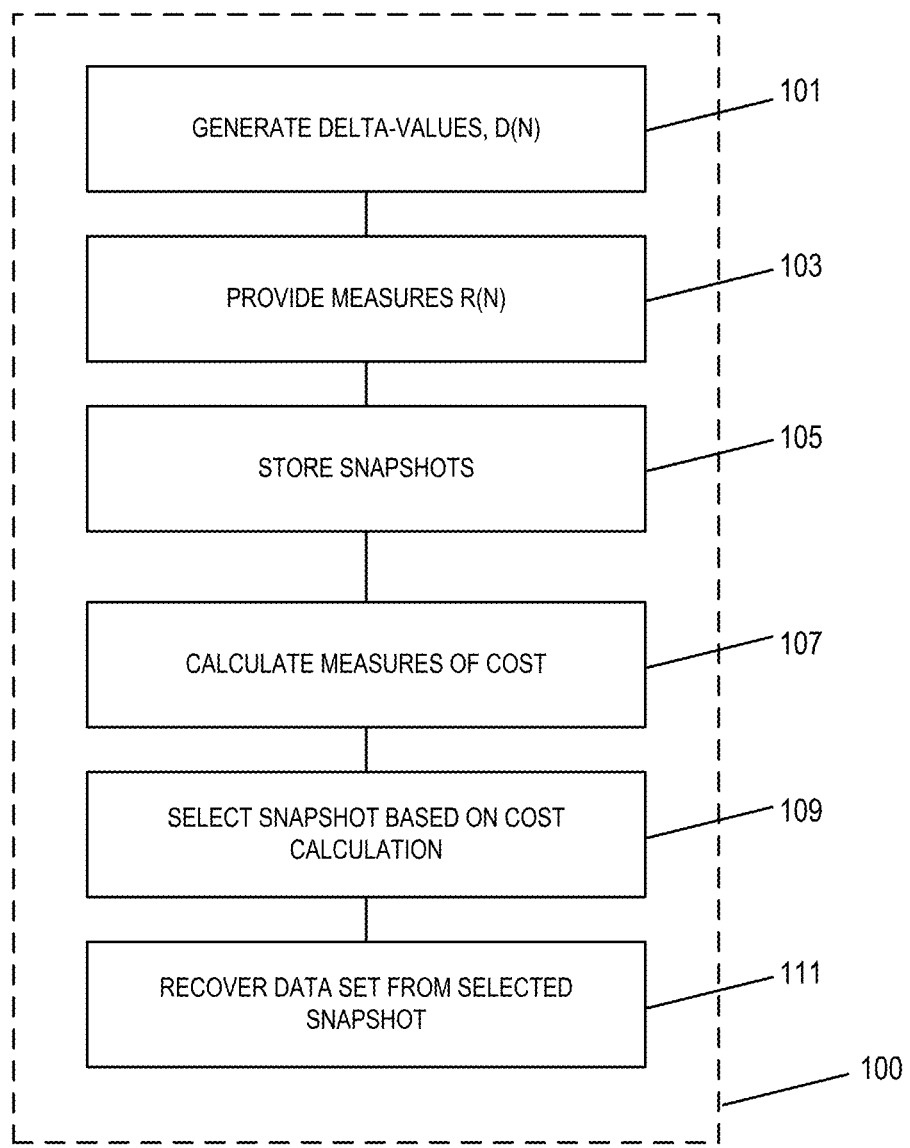
FIG. 1 is a schematic representation of a method for data recovery in a continuous data protection system according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein. Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In replication solutions such as CDP systems pseudo journaling is performed by storing multiple PIT objects containing the contents of modified blocks every few minutes or seconds within recovery windows which are typically of the order of hours (e.g., 6 hours). The recovery windows are bookmarked with snapshots at the beginning of each window stored at a target device. That is, a recovery window can be defined by a pair of snapshots that demarcate it from other recovery windows, and recovery windows are often independent of the number and volume of datasets within them.

A snapshot represents a full image of a disk at a given time. Thus, due to their size and the computational overhead in generating and storing them, the interval between snapshots being generated is typically of the order of hours, although it may be longer (or indeed shorter) than this depending on the specific requirements of the backup administrator. Furthermore, systems also often only support a limited number of snapshots per disk or VM.

To restore to any one of the PITs (within a recovery window) the target will revert to the previous snapshot (i.e., the snapshot before the PIT in question and apply each PIT object until the requested recovery point state is reached. As noted, this is costly in time and in terms of the number of input/output operations (IOs), especially when the recovery point is more than either half way within the recovery window, or comprises more than 50% of the cumulative IOs such that the number of operations to be performed in getting to the PIT from the snapshot is large.

By way of example, in order to describe a typical PIT backup and restoration operation, consider the contents of a block of data on a disk that is written once every 10 minutes. At 10:00 the initial value is 10, then at 10:10 the value is 13 and so on as illustrated in the table below:

TABLE 1

| | Time | | | | | | | |
|---|---|---|---|---|---|---|---|---|
| | 10:00 | 10:10 | 10:20 | 10:30 | 10:40 | 10:50 | 11:00 | 11:10 |
| Block contents | 10 | 13 | 3 | 17 | 23 | 123 | 12 | 93 |

TABLE 1-continued

| | Time | | | | | | | |
|---|---|---|---|---|---|---|---|---|
| | 10:00 | 10:10 | 10:20 | 10:30 | 10:40 | 10:50 | 11:00 | 11:10 |
| Dataset | | $ds_0$ | $ds_1$ | $ds_2$ | $ds_3$ | $ds_4$ | $ds_5$ | $ds_6$ |
| Snapshots | $snap_0$ | | | | | | $snap_1$ | |

In this example, a snapshot is periodically performed (every hour) such that there is a snapshot at 10:00 (snap0) and one at 11:00 (snap1).

In order to restore to a point in time, such as 10:40 (in order to obtain dataset ds3) for example, the procedure is:
 Restore the target to state "snap0"
 Re-apply ds0, ds1, ds2 and ds3 in sequential order
 so that the disk is in the correct state for the required PIT restore and the data block in question has the contents "23", corresponding to dataset ds3.

As noted above, this requires working from a snapshot that has been generated before the PIT in question and then applying all subsequent block contents in order to arrive at the required state. That is, because each dataset contains the contents of multiple and different blocks, and because data consistency should be maintained, every dataset must be applied to the snapshot in order to achieve the desired PIT state.

In order to improve efficiency and reduce the recovery time, frequent snapshots may be performed to reduce the average total number of datasets that must be applied to any snapshot. However, many storage technologies limit the number of supported snapshots and/or snapshots may be resource inefficient or slow.

According to an example, a method is provided in which delta-values can be used in order to restore to a PIT within a recovery window starting from either of the snapshots that define the recovery window. That is, the delta-values can be applied in either direction from a snapshot of a recovery window in order to enable restoration of data to a desired PIT within that recovery window. Accordingly, applying the delta-value to current contents enables generation of the new value of a block and reapplying this delta-value restores the contents to the previous value.

Advantageously, the method can start from a snapshot after a required PIT restoration point and proceeds by application of intermediate datasets in order to reverse changes to achieve the desired state. In a particularly advantageous scenario, for PITs more than halfway through the window and thus relatively farther away from a snapshot at the start of a restoration window than at the end, the restoration method provided herein is faster and less resource intensive than the case described above in which a prior (to a required PIT) snapshot is used as a starting point irrespective of whether that will incur large computational costs. It should be noted that, in terms of the position of a PIT within a recovery window, decisive is its distance from a snapshot in terms of the number of IOs to be performed in obtaining the state defined at that PIT when starting from a particular snapshot rather than distance as measured in terms of position within a recovery window relative to other PIT states. The measure of distance is therefore a measure of cost associated with recovering to a given state from a given starting point.

Put another way, given a recovery window that is bookmarked by snapshots at either end, for the case of restoring to a point that is more than halfway through the window (relative to the first snapshot) it may be faster or less computationally expensive to restore from the end snapshot (i.e., the snapshot that occurs after the required PIT) compared with the snapshot that is provided at the start of the recovery window (i.e., the snapshot that occurs before the required PIT). In an example, the determination of starting point is based on the number of changes for recovery determined using each snapshot at the beginning and end of a recovery window within which the PIT resides. Thus, a 'reverse' restoration process can be performed.

When a new snapshot is created, the oldest snapshot is typically deleted. However, as long as the datasets are maintained (e.g., on cheap secondary storage such as an object store), the ability to restore to a PIT older than the oldest snapshot is preserved. The method also enables datasets to be merged to achieve lower granularity thereby reducing resource requirements. In an implementation, even with limited snapshot resources, and in the case that IO patterns are not constant (e.g., burst traffic), snapshots can be scheduled based on IO volume rather than fixed time intervals further reducing restore time.

In an example, a delta-value, $d(n)$, is generated from the exclusive disjunction between successive values of data block contents of a content fragment of a dataset at a time $t(n)$ and a time $t(n-1)$ for $n=1$ to $i$, where $i$ is selected according to a predetermined data protection profile. For example, an exclusive-OR (XOR) operation can be performed on pairs of values.

The use of such a delta-value enables reversion from a snapshot after a given PIT by applying multi-directional data in respect of PIT objects when it is more efficient than applying IOs from beginning of a recovery window. That is, the delta-values enable PIT recovery or reversion in which a cost to recover is considered, thereby enabling recovery from one of multiple snapshots irrespective of whether that means a forward or backward operation being applied.

In an example, the chosen direction is determined by calculating the lowest IO weight and required processing resources. Accordingly, snapshots can be performed dynamically based on IOs rather than on a fixed (e.g., 6 hour) schedule. Furthermore, it is possible to heuristically delete intermediate snapshots while maintaining performance requirements.

A worked example using a simplified set of data is now described in order to illustrate the principle of the method provided. Firstly, in the table below it is assumed that each dataset contains the raw contents of an updated data block. An XOR function is used to generate delta-values between respective pairs of block states. That is, a delta-value, $d(n)=$(value of data block contents at time $t(n-1)$) XOR (value of data block contents at time $t(n)$).

Thus, with reference to the table below, delta-value $d(0)$ for PIT $ds0=10$ XOR $13=7$. In an example, performing this operation across the block contents under consideration, the dataset now contains the set of delta-values for all the changed blocks as well as metadata containing the number of changed blocks.

TABLE 2

| | Time | | | | | | | |
|---|---|---|---|---|---|---|---|---|
| | 10:00 | 10:10 | 10:20 | 10:30 | 10:40 | 10:50 | 11:00 | 11:10 |
| Block contents | 10 | 13 | 3 | 17 | 23 | 123 | 12 | 93 |
| Dataset | | $ds_0$ | $ds_1$ | $ds_2$ | $ds_3$ | $ds_4$ | $ds_5$ | $ds_6$ |
| Snapshots | $snap_0$ | | | | | | $snap_1$ | |
| Delta-Value | | 7 | 14 | 18 | 6 | 108 | 119 | 81 |

TABLE 2-continued

| | Time | | | | | | |
|---|---|---|---|---|---|---|---|
| | 10:00 | 10:10 | 10:20 | 10:30 | 10:40 | 10:50 | 11:00 | 11:10 |
| Total block changes in dataset | | 10 | 15 | 7 | 4 | 100 | 20 | 0 |

So, to restore to a PIT—10:40 for example, which is ds3—the following calculation can be performed in order to determine the cost to restore to that point from differing starting points (i.e., from different snapshots, regardless of whether they are logically positioned before or after the required PIT in question):

In the case of the data provided in the table above, restoring forwards from snap0 to ds3 implies a cost of 10+15+7+4=36. Restoring in reverse from snap1 to ds3 implies a cost of 100+20=120.

Note that the values used to calculate cost (noted as total changes in dataset in the table above) represent read/write or input/output operations that are performed each time data is recorded. Thus, the larger the value, the higher the 'cost' associated with the particular operation.

Accordingly, in this example, given the total number of IOs, restoration would proceed in the 'forward' direction, i.e., starting with snapshot snap0 as the basis, since this represents the option with the lowest cost.

FIG. 1 is a schematic representation of a method for data recovery in a continuous data protection system according to an example. In block 101, delta-values, d(n), are generated for the system 100. The delta-values represent an exclusive disjunction between successive values of data block contents (D(n)) of a content fragment of a dataset ds at a time t(n) and a time t(n−1) for n=1 to i, where i is selected according to a predetermined data protection profile. For example, d(k) =D(k−1) XOR D(k). So, with reference to the example above, in table 2, d(3)=17 XOR 23=6 (base 10). In this connection, the dataset ds3 may can be restored by applying datasets that are intermediate ds3 and a starting snapshot.

In block 103, measures, r(n), representing the number of operations performed by the data protection system in storing the contents of a data block at time t(n) are provided. For example, r(n) represents the number of IO operations performed by the system in storing data at a given PIT. Again, with reference to table 2, for example, r(4)=100. As described above, the r(n) represent a measure of cost that can be used to determine from which snapshot a recovery operation should be performed in order that a cost to restore data to a required PIT is minimized.

In block 105, snapshots, s(f(p)), are stored at preselected intervals. Each snapshot indicates a value of the content fragment at t(p) where p⊆n, and f(p) is a function that is selected according to the predetermined data protection profile. In an example, there are fewer snapshots than data block values, and so p<n. Thus, a pair of successive snapshots demarcate a recovery window within which there are a number of D(n). The predetermined data protection profile defines parameters including, for example, the value of p and/or n, thereby enabling the granularity of snapshots to be defined according to, e.g., system requirements.

In block 107, the measures, r(n), are used to calculate a cost to restore the dataset to a value at a selected point in time, t(j). The cost to restore is calculated from a first snapshot, s(f(pa)), and from a second snapshot, s(f(pb)). These snapshots define a recovery window within which the selected point lies. That is, the first and second snapshots demarcate a recovery window within which the dataset D(j) is provided. So, for example, with reference to table 2, ds2 lies between s(0) and s(1), whereas ds6 does not.

In block 109, the snapshot, s(f(pq)), that minimizes the cost to restore, where q=a or b, is selected. That is, a determination is made as to whether, based on the measures r(n), it is computationally more efficient to recover starting from the first or from the second snapshot.

In block 111, the dataset is recovered to the value at the selected point in time, t(j), using the selected snapshot s(f(pq)) and each of the delta values d(pq) to d(j).

An alternative example is presented below in table 3 as a worked example in view of the description provided above with reference to FIG. 1:

TABLE 3

| | Time | | | | | | | |
|---|---|---|---|---|---|---|---|---|
| | 10:00 | 10:10 | 10:20 | 10:30 | 10:40 | 10:50 | 11:00 | 11:10 |
| Block contents | 10 | 13 | 3 | 17 | 23 | 12 | 12 | 93 |
| Dataset | | $ds_0$ | $ds_1$ | $ds_2$ | $ds_3$ | $ds_4$ | $ds_5$ | $ds_6$ |
| Snapshots | $snap_0$ | | | | | | $snap_1$ | |
| Delta-Value | | 7 | 14 | 18 | 6 | 27 | 0 | 81 |
| Total block changes in dataset | 10 | 15 | 7 | 4 | 10 | 20 | 0 | |

To recover data as it was at time 10:50, the cost to restore from snap0 is 46, whereas the cost to restore from snap1 is 30. Thus, restoration can proceed optimally from snap1 using this snapshot and the delta-values 0 and 27.

Figure 2:
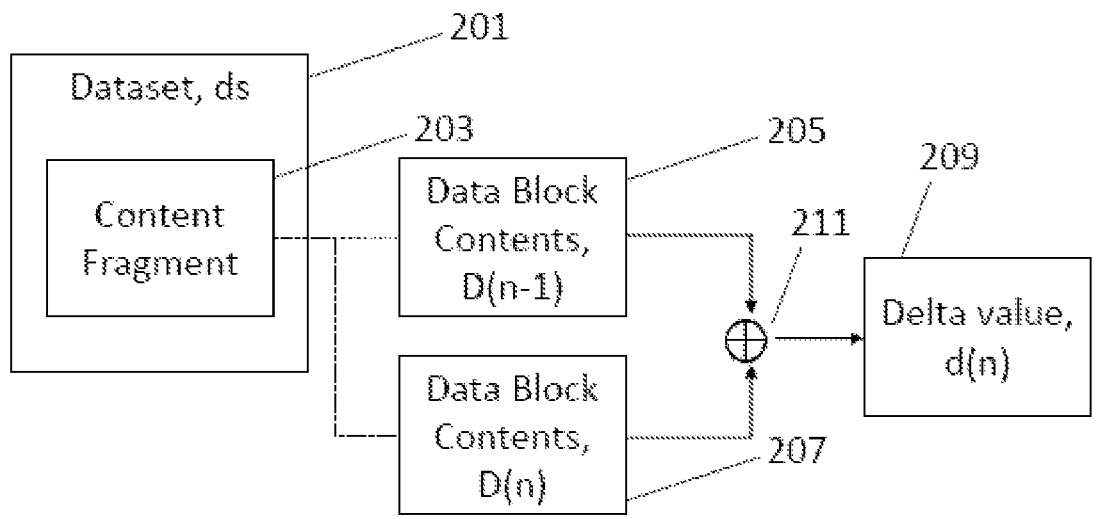
FIG. 2 is a schematic representation of a continuous data protection system according to an example.

FIG. 2 is a schematic representation of a continuous data protection system, according to an example. In the example of FIG. 2, a dataset ds, 201, comprises a content fragment 203 in the form of a portion of data to be backed up. The content fragment comprises data block contents 205 and 207. A delta value 209 is generated from the data block contents 205, 207 using an exclusive-OR operation 211. This process may be repeated over respective pairs of data blocks of the content fragment to generate multiple delta values.

Figure 3:
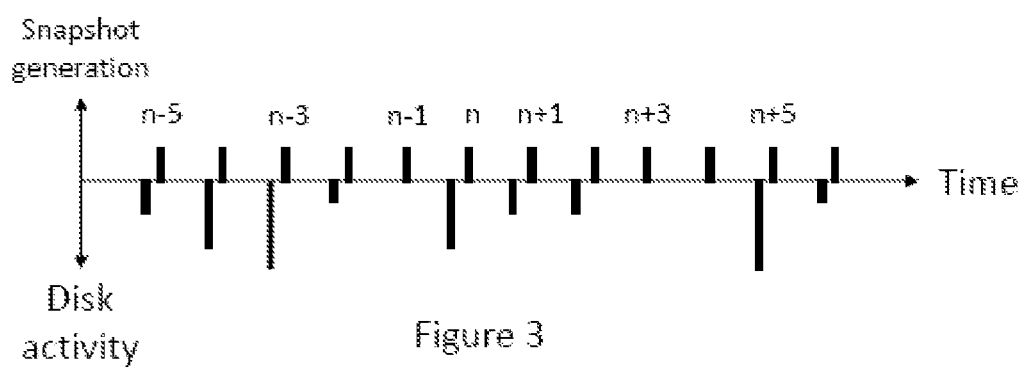
FIG. 3 is a schematic representation of a snapshot profile according to an example.

FIG. 3 is a schematic representation of a snapshot profile according to an example. In the example of FIG. 3, the snapshot profile is defined according to the predetermined data protection profile, which can specify whether snapshots are taken at regular intervals or according to a volume of IOs such that the interval may be variable and thus tuned according to disk activity. For example, a larger amount of disk activity in the form of, e.g., a larger number of IOs can result in a larger number of snapshots being taken since the time between successive snapshots, as measured based on the IO volume, will be shorter. That is, a given IO volume, such as a predetermined number of IOs, can trigger generation of a snapshot irrespective of the time from the last snapshot. Accordingly, a period of intense disk activity can result in a larger number of snapshots within a given period of time compared to the case in which there is less disk activity within that period. In FIG. 3, a regular snapshot interval is provided, in which snapshots are generated at specified regular intervals, irrespective of disk activity. Note that the relative lengths of the lines for disk activity represent to amount of disk activity, i.e., the longer the line the more disk activity.

Figure 4:
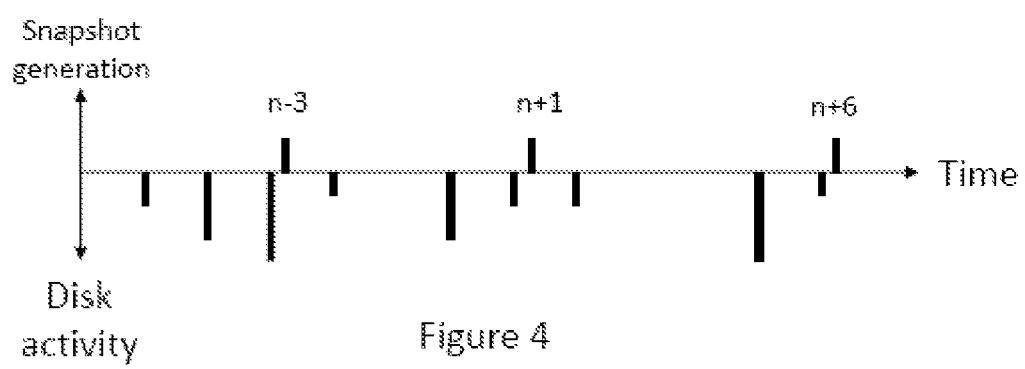
FIG. 4 is a schematic representation of a snapshot profile according to an example.

FIG. 4 is a schematic representation of a snapshot profile according to an example. In the example of FIG. 4, snapshots are generated at irregular intervals that are determined on the basis of disk activity (IOs). In FIG. 4, an irregular snapshot interval is provided, in which snapshots are generated according to the level of disk activity. Far fewer snapshots are provided in the example of FIG. 4 compared to that of FIG. 3, which both represent exaggerated examples for the purposes of explanation. Note also that the representation of disk activity is somewhat offset from the corresponding snapshot position for the purposes of illustration. In a practical implementation, a snapshot may be triggered at the point that a predetermined volume of IOs has been reached. It may therefore be the case that a snapshot occurs almost simultaneously with some disk activity, and the representation in FIG. 4 is simplified and exaggerated in its simplicity to demonstrate the overarching principle of irregular snapshot generation only.

Examples in the present disclosure can be provided as methods, systems, or machine-readable instructions, such as any combination of software, hardware, firmware or the like. Such machine-readable instructions may be included on a computer readable storage medium (including but not limited to disc storage, compact disc read-only memory (CD-ROM), optical storage, etc.) having computer readable program codes therein or thereon.

The present disclosure is described with reference to flow charts and/or block diagrams of the method, devices, and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (for example, a module 211 implementing a function to calculate the exclusive disjunction of data blocks) may be implemented by a processor executing machine readable instructions stored in a memory, or a processor operating in accordance with instructions embedded in logic circuitry. The term 'processor' is to be interpreted broadly to include a central processing unit (CPU), a processing unit, an application-specific integrated circuit (ASIC), a logic unit, a programmable gate set, etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 5:
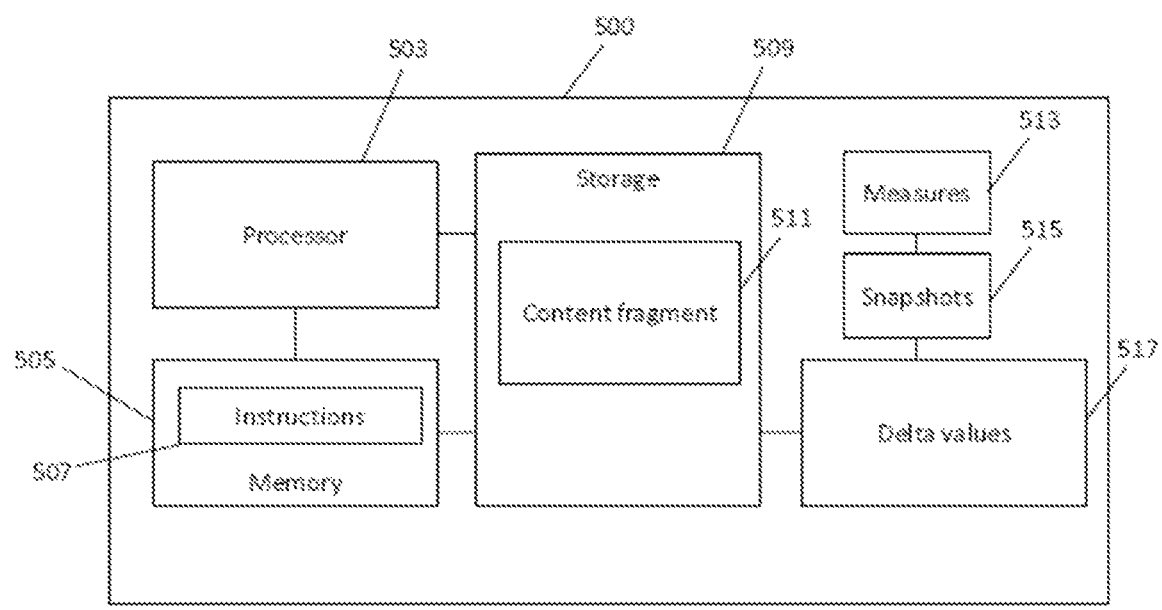
FIG. 5 is a schematic representation of a continuous data protection system, forming a data backup apparatus, according to an example.

FIG. 5 is a schematic representation of a continuous data protection system, forming a data backup apparatus, according to an example. System 500 comprises a processor 503 and a memory 505 storing instructions 507. A storage 509 can be provided comprising a content fragment 511 to be backed up.

The instructions 507 are executable by the processor 503. The instructions 507 can comprise instructions to: generate delta values, d(n), 517 representing an exclusive disjunction between successive values of data block contents of the content fragment 511 of a dataset at a time t(n) and a time t(n−1) for n=1 to i, where i is selected according to a predetermined data protection profile; provide measures, r(n), 513 of the number of operations performed by the data protection system 500 in storing the contents of a data block at time t(n); store snapshots, s(f(p)), 515 at preselected intervals, of the contents of the content fragment 511 at t(p) where p⊆n, and f(p) is a function that is selected according to the predetermined data protection profile; use the measures, r(n), 513 to calculate a cost to restore the dataset to a value at a selected point in time, t(j), from first s(f(pa)) and second s(f(pb)) snapshots, the first and second snapshots defining a recovery window within which the selected point lies; select the snapshot s(f(pq)) that minimizes the cost to restore, where q=a or b; and, recover the dataset to the value at the selected point in time, t(j), using the selected snapshot s(f(pq)) and each of the delta values d(pq) to d(j).

Accordingly, the system 500 can implement a method for data recovery. Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

What is claimed is:

1. A method for data recovery in a data protection system, the method comprising:
generating delta values d(n) representing an exclusive disjunction between successive values of data block contents of a content fragment of a dataset at a first time t(n) and a second time t(n−1), wherein n=1 to i, and wherein i is based on a predetermined data protection profile;
providing measures r(n) of a first number of operations of the data protection system in storing contents of a data block at the first time t(n);
storing, at preselected intervals, snapshots s(f(p)) of the contents of the content fragment at t(p), wherein p⊆n, and wherein f(p) is a function that is based on the predetermined data protection profile;
calculating, using the measures r(n), a cost to restore the dataset to a value at a selected point in time t(j) starting from a first snapshot s(f(pa)) and a second snapshot s(f(pb)), wherein the first snapshot s(f(pa)) and the second snapshot s(f(pb)) define a recovery window within which the selected point lies;
selecting a third snapshot s(f(pq)) that minimizes the cost to restore, wherein q=a or b; and
recovering the dataset to the value at the selected point using the third snapshot s(f(pq)) and delta values d(pq) to d(j).

2. The method of claim 1, wherein the cost to restore the dataset comprises a measure representing a second number of read/write operations.

3. The method of claim 1, further comprising generating a fourth snapshot of the contents of the content fragment.

4. The method of claim 3, wherein the data protection profile defines an interval for generation of the fourth snapshot.

5. The method of claim 4, wherein the interval is irregular.

6. The method of claim 5, wherein the interval is based on a pattern of read/write operations.

7. The method of claim 1, wherein the exclusive disjunction between successive values of data block contents of the content fragment of the dataset comprises an exclusive-OR (XOR) operation performed on pairs of values.

8. A non-transitory machine-readable storage medium encoded with instructions for data recovery in a data protection system, the instructions executable by a processor to:
generate delta values d(n) representing an exclusive disjunction between successive values of data block contents of a content fragment of a dataset at a first time t(n) and a second time t(n−1), wherein n=1 to i, and wherein i is based on a predetermined data protection profile;
provide measures r(n) of a number of operations of the data protection system in storing contents of a data block at the first time t(n);
store, at preselected intervals, snapshots s(f(p)) of the contents of the content fragment at t(p), wherein p⊆n, and wherein f(p) is a function that is based on the predetermined data protection profile;
calculate, using the measures r(n), a cost to restore the dataset to a value at a selected point in time t(j) starting from a first snapshot s(f(pa)) and a second snapshot s(f(pb)), wherein the first snapshot s(f(pa)) and the second snapshot s(f(pb)) define a recovery window within which the selected point lies;
select a third snapshot s(f(pq)) that minimizes the cost to restore, wherein q=a or b; and
recover the dataset to the value at the selected point in time, t(j), using the third snapshot s(f(pq)) and delta values d(pq) to d(j).

9. The non-transitory machine-readable storage medium of claim 8, wherein the instructions are further executable by the processor to:
determine a volume of disk operations for the data protection system, wherein the volume of disk operations represents a first measure of input/output activity of a disk; and
generate, using the volume of disk operations, a second measure of the number of operations performed by the data protection system in storing the contents of the data block.

10. The non-transitory machine-readable storage medium of claim 9, wherein the instructions are further executable by the processor to:
perform a comparison of the volume of disk operations to a predefined threshold value for disk activity; and
generate a snapshot based on the comparison.

11. The non-transitory machine-readable storage medium of claim 8, wherein the instructions are further executable by the processor to select a pair of snapshots demarcating the recovery window within which the selected point in time occurs.

12. The non-transitory machine-readable storage medium of claim 8, further comprising instructions executable by the processor to generate a fourth snapshot of the contents of the content fragment, wherein the data protection profile defines an interval for generation of the fourth snapshot.

13. A data backup apparatus comprising:
a memory configured to store instructions;
a processor coupled to the memory and configured to execute the instructions to:
generate delta values d(n) representing an exclusive disjunction between successive values of data block contents of a content fragment of a dataset at a first time t(n) and a second time t(n−1), wherein n=1 to i, and wherein i is based on a predetermined data protection profile;
provide measures r(n) of a first number of operations of the data backup apparatus in storing contents of a data block at the first time t(n);
store, at preselected intervals, snapshots s(f(p)) of the contents of the content fragment at t(p), wherein p⊆n, and wherein f(p) is a function based on the predetermined data protection profile;
calculate, using the measures r(n), a cost to restore the dataset to a value at a selected point in time t(j) starting from a first snapshot s(f(pa)) and a second snapshot s(f(pb)), wherein the first snapshot s(f(pa)) and the second snapshot s(f(pb)) define a recovery window within which the selected point lies;
select a third snapshot s(f(pq)) that minimizes the cost to restore, wherein q=a or b; and
recover the dataset to the value at the selected point in time, t(j), using the third snapshot s(f(pq)) and delta values d(pq) to d(j).

14. The data backup apparatus of claim 13, further comprising a storage configured to store at least one of a measure, a snapshot, or a delta value.

15. The data backup apparatus of claim 13, wherein the cost to restore the dataset comprises a measure representing a second number of read/write operations.

16. The data backup apparatus of claim 13, wherein the processor is further configured to execute the instructions to generate a snapshot of the contents of the content fragment.

17. The data backup apparatus of claim 16, wherein the predetermined data protection profile defines an interval for generation of the snapshot.

18. The data backup apparatus of claim 17, wherein the interval is irregular.

19. The data backup apparatus of claim 18, wherein the interval is based on a pattern of read/write operations.

20. The data backup apparatus of claim 13, wherein the exclusive disjunction between successive values of data block contents of the content fragment of the dataset comprises an exclusive-OR (XOR) operation performed on pairs of values.

* * * * *